(12) United States Patent
Hayakawa et al.

(10) Patent No.: US 7,272,798 B2
(45) Date of Patent: Sep. 18, 2007

(54) METHOD FOR INTERMEDIATING IMAGES (75) Inventors: Tokuya Hayakawa, Kawasaki (JP); Mitsutaka Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 518 days.

(21) Appl. No.: 10/108,424

(22) Filed: Mar. 29, 2002

(65) Prior Publication Data
US 2003/0016244 A1 Jan. 23, 2003

(30) Foreign Application Priority Data
Jul. 18, 2001 (JP) .............................. 2001-218037

(51) Int. Cl.
G06F 3/00 (2006.01)
(52) U.S. Cl. .................................... 715/751
(58) Field of Classification Search ................ 715/716, 715/733, 776, 738, 751, 753
See application file for complete search history.

(56) References Cited

U.S. PATENT DOCUMENTS 6,535,228 B1 * 3/2003 Bandaru et al. ............ 715/752
6,578,072 B2 * 6/2003 Watanabe et al. ........... 709/217
6,757,684 B2 * 6/2004 Svendsen et al. ............. 707/10
6,950,800 B1 * 9/2005 McIntyre et al. .............. 705/1
2001/0026376 A1 * 10/2001 I'Anson ...................... 358/400
2001/0032335 A1 * 10/2001 Jones ......................... 725/105

* cited by examiner

Primary Examiner—Kristine Kincaid
Assistant Examiner—Thanh Vu
(74) Attorney, Agent, or Firm—Staas & Halsey LLP (57) ABSTRACT In a method for intermediating images, user group information concerning at least one user group to which the user belongs is extracted from a user group table recording a relationship between the user and the user group based on the authentication information of a user. The user group information extracted is sent to the user and obtaining information of a selected user group selected by the user and an image corresponding to the selected user group selected by the user is extracted. Then, the image corresponding to the selected user group is sent to the user.

6 Claims, 11 Drawing Sheets

USER FILE

| USER ID | USER NAME | PASSWORD | ADDRESS | CREDIR CARD INFORMATION |
|---|---|---|---|---|
| 123 | Yamada,Taro | abc | K CITY | 12345678 |
| 456 | Sato,Hanako | def | N CITY | 90123456 |
| ⋮ | | | | |

801

USER GROUP FILE

| USER GROUP ID | USER GROUP NAME | REGISTERED MEMBERS |
|---|---|---|
| G001 | A BASEBALL GROUP | 123,456,789,⋯ |
| G002 | B SHOP STREET | 456,234,⋯ |
| G003 | C CIRCLE | 567,890,345,678,901,⋯ |
| G004 | B BASEBALL GROUP | 123,456,789,⋯ |
| G005 | C BASEBALL GROUP | 123,456,789,⋯ |
| ⋮ | | |

802

IMAGE MANAGEMENT FILE

| USER GROUP ID | IMAGE No. | IMAGE NAME | NUMBER PERMITTED TO INQUIRE | IMAGE INFORMATION |
|---|---|---|---|---|
| G001 | P001 | YAMADA | 123,456 | C:¥data¥g001¥p001 |
| G001 | P002 | TOYAMA | 123 | C:¥data¥g001¥p002 |
| G001 | P003 | HIDA | 123,456 | C:¥data¥g001¥p003 |
| G001 | P004 | TOUDA | 123,456 | C:¥data¥g001¥p004 |
| G002 | P001 | COMFORT TRIP 01 | 456,234 | C:¥data¥g002¥p001 |
| | ⋮ | | | |

IMAGE FILE STORAGE STRUCTURE

FIG.10

USER GROUP SELECTING WINDOW

```
USER GROUP SELECTING WINDOW                      ⎫
                                                 ⎬ 11
USER ID : 123   USER NAME : MR. YAMADA,TARO      ⎪
PLEASE SELECT USER GROUP                         ⎭

■ A BASEBALL GROUP                               ⎫
■ B BASEBALL GROUP                               ⎪
■ C BASEBALL GROUP                               ⎪
                                          1001   ⎬ 12
                                                 ⎪
                                                 ⎪
                                                 ⎭

[ END ]      } 13
```

IMAGE LIST WINDOW

```
A BASEBALL GROUP    IMAGE LIST WINDOW            ⎫
                                                 ⎬ 21
USER ID : 123   USER NAME : MR. YAMADA,TARO      ⎭

YAMADA    TOYAMA    HIDA    TOUDA             ⎫
                                                 ⎪
   [img]     [img]     [img]   [img]      1002   ⎬ 22
                                                 ⎪
    [✓]       [ ]       [ ]     [ ]              ⎭

[PURCHASE] [REGISTER] [END]             } 23
```

FIG.11

METHOD FOR INTERMEDIATING IMAGES

BACKGROUND OF THE INVENTION

1. Field of the Invention

The present invention generally relates to a method for intermediating images that provides a service providing images via a network.

2. Description of the Related Art

Recently, a net album service is provided to allow users to register images (including static images and dynamic images) on a service site of the Internet. In such a conventional image providing service, a user uploads a digital image through the network or brings image data or a film to a DPE shop and asks the DPE shop to upload through the network, so as to register images to the service site of the Internet. The service site protects the images registered by the user by a password and then opens the images on the network. After that, the user and visitors permitted by the user can browse, select, and download an image. Also, the user and the visitors can make a request of the service site for an extra development of a silver film of the images.

The conventional technique described above is effective in a case in which the user personally registers the image data. However, in a case in which a plurality of users as a group individually attempt to register images to the same album, several problems occur.

For example, the group travels together and several people take some pictures. And each of the photographers separately registers images in the conventional technique. And, each of the photographers is required to provide his or her password to all members of the group and the members of the group are required to input a different password for each of the photographers to access his or her album registered by each of the photographers

SUMMARY OF THE INVENTION

It is a general object of the present invention to provide a method for intermediating images in which the above-mentioned problems are eliminated.

A more specific object of the present invention is to provide a method for intermediating images at the service site in that an album is provided to be shared by a group on the network, and users belonging to the group can freely refer to the same album and register the images to the service site.

The above objects of the present invention are achieved by a method for intermediating images, comprising the steps of: (a) receiving authentication information of a user; (b) extracting user group information concerning at least one user group to which the user belongs, from a user group table recording a relationship between the user and the user group based on the authentication information; (c) sending the user group information extracted in the step (b) to the user and obtaining information of a selected user group selected by the user; (d) extracting an image corresponding to the selected user group selected by the user; and (e) sending the image corresponding to the selected user group to the user.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
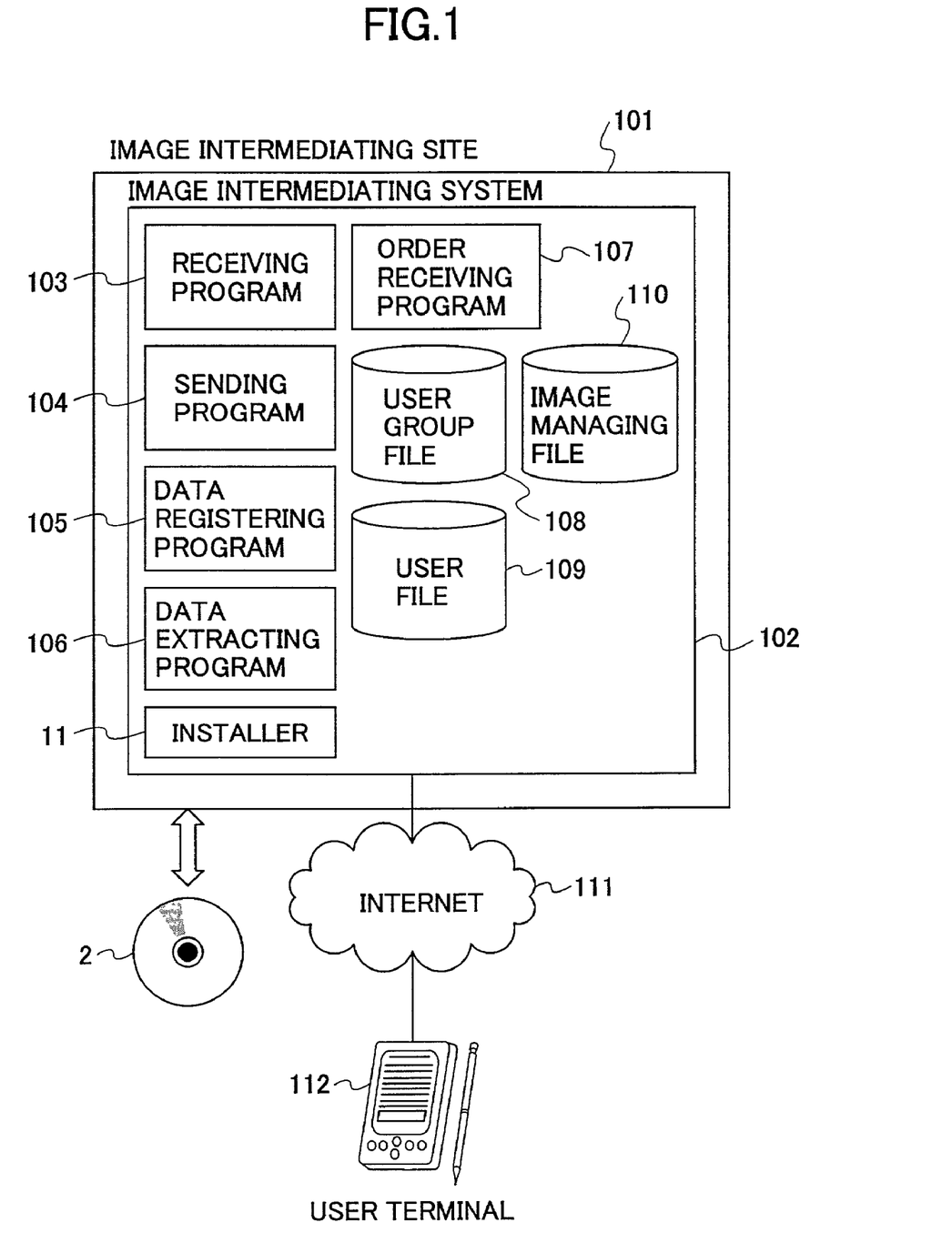
FIG. 1 is an overview diagram showing a system according to an embodiment of the present invention.

An overview of a system according to the present invention will be described. An image intermediating site 101 may be managed by a company providing a DPE service on a network.

In the image intermediating site 101, an image intermediating system 102 is employed as a main computer system in an embodiment of the present invention.

The image intermediating system 102 includes a communication controlling part and for example, a user terminal 112 is connected to the image intermediating system 102 through the Internet 111 as a network. Also, a plurality of the user terminals 112 can be connected to the image intermediating system 102 through the Internet 111.

The image intermediating system 102 includes an installer 11, a receiving program 103 for receiving information from the user terminal 112, a sending program 104 for sending information to the user terminal 112, a data registering program 105 for registering image information of the user by accessing each file in the information intermediating system 102 based on the information received by the receiving program 103, a data extracting program 106 for extracting information to be provided to the user terminal 112, and an order receiving program 107 for accepting order information from the user terminal 112.

These programs 103 through 107 are stored in an external storage unit of the image intermediating system 102 by the installer 11 installing from a CD-ROM (Compact Disk Read Only Memory) 2, and read and temporarily stored in an internal storage unit when each of the programs 103 through 107 is being executed.

Moreover, the external storage unit of the image intermediating system 102 includes a user group file 108 for storing user group information, a user file 109 for storing user information, and an image managing file 110 for managing images of the user group. These files 108 through 110 are referred to and updated by the receiving program 103, the sending program 104, the data registering program 105, and the data extracting program 106 if necessary.

Figure 2:
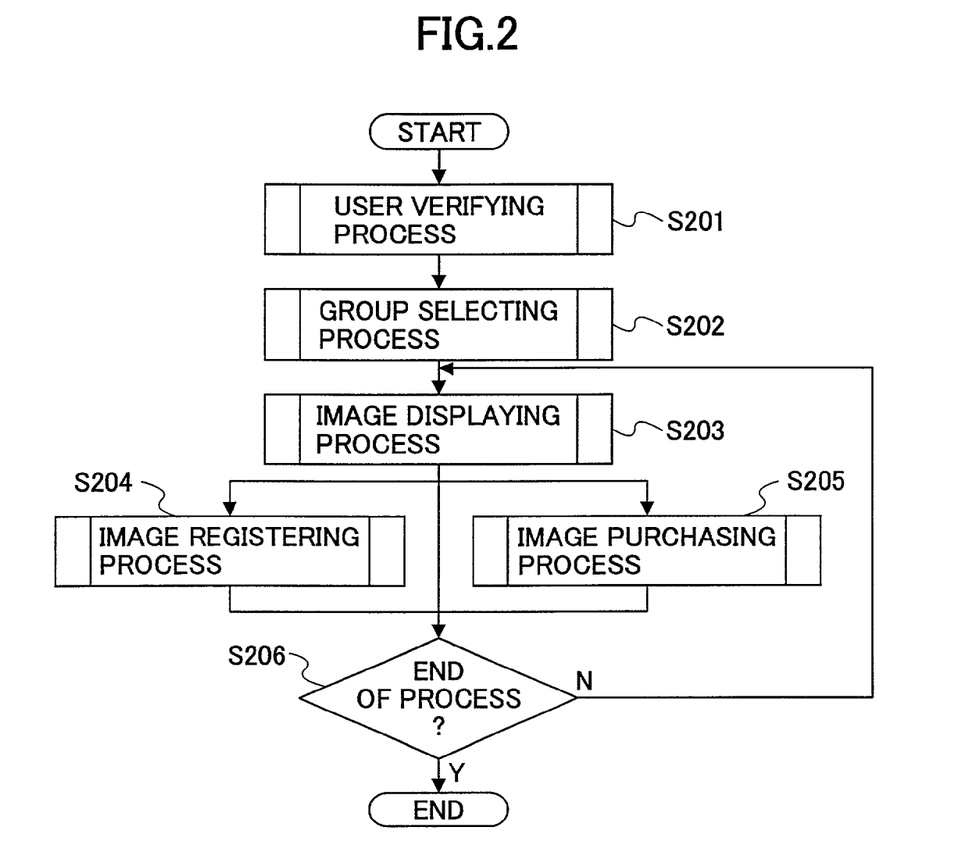
FIG. 2 is a flowchart for explaining a process overview according to the embodiment of the present invention.

An overview of a main process will be described according to the embodiment of the present invention with reference to FIG. 2.

In step S201, a user verifying process is conducted. When the user is provided with service from the image intermediating system 102, the user connects the user terminal 112 to the image intermediating system 101 through the Internet 111.

In this case, a user ID and a password are registered with user information of the user to the image intermediating system 102 beforehand. Thus, the user sends the user ID and the password from the user terminal 112 to the image intermediating system 102, and then the receiving program 103 receives the user ID and the password. In addition, the receiving program 103 conducts user verification.

In step S202, a group selecting process is conducted. Based on the user ID received by the receiving program 103, the data extracting program 106 extracts the user group information showing a group to which the user belongs and then the sending program 104 provides the user group information to the user terminal 112. The user selects the user group, which the user wants to see images of, from the information.

In step S203, the image displaying process is conducted. When the receiving program 103 received user group selection information, which is information of the user group selected by the user in the step S202, the data extracting program 106 extracts an image set as images of the user group selected by the user from images registered in the image intermediating site 102 based on the user group selection information. The sending program 104 provides information concerning the image set to the user. Three alternatives are provided to the user.

In step S204, an image registering process is conducted. In the image registering process, the data registering program 105 adds and registers an image to the information concerning the image set provided in the step S203. When the image registering process is completed, the main process goes to step S206.

In step S205, an image purchasing process is conducted. The user selects a desired image from the information concerning the image set. The receiving program 107 performs a service of the extra development (hard copy) of the desired image. When the main process is completed, the main process goes to the step S206.

In the step S206, it is determined whether or not the main process is completed. When the user makes an instruction for completing a request of the service, the image intermediating system is terminated. Otherwise, the main process goes back to the step S203.

Each process in FIG. 2 will be described in detail.

Figure 3:
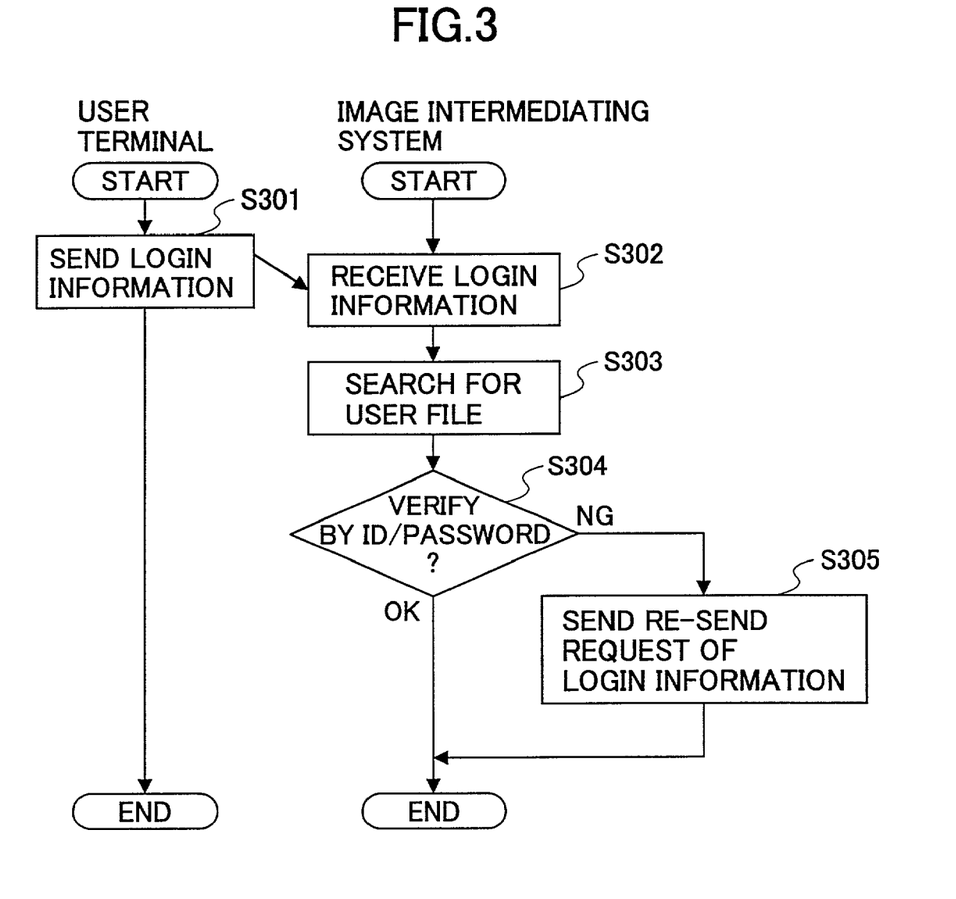
FIG. 3 is a flowchart for explaining a user authentication process.

The user verifying process in the step S201 in FIG. 2 will be described in detail with reference to FIG. 3.

In step S301, the user terminal 112 sends login information input by the user to the image intermediating system 102. That is, the user inputs the user ID and the password and information indicating the user ID and the password is sent to the image intermediating system 102.

In step S302, the receiving program 103 receives the login information sent in the step S301.

In step S303, the user file 109 is retrieved by the receiving program 103.

Figure 8:
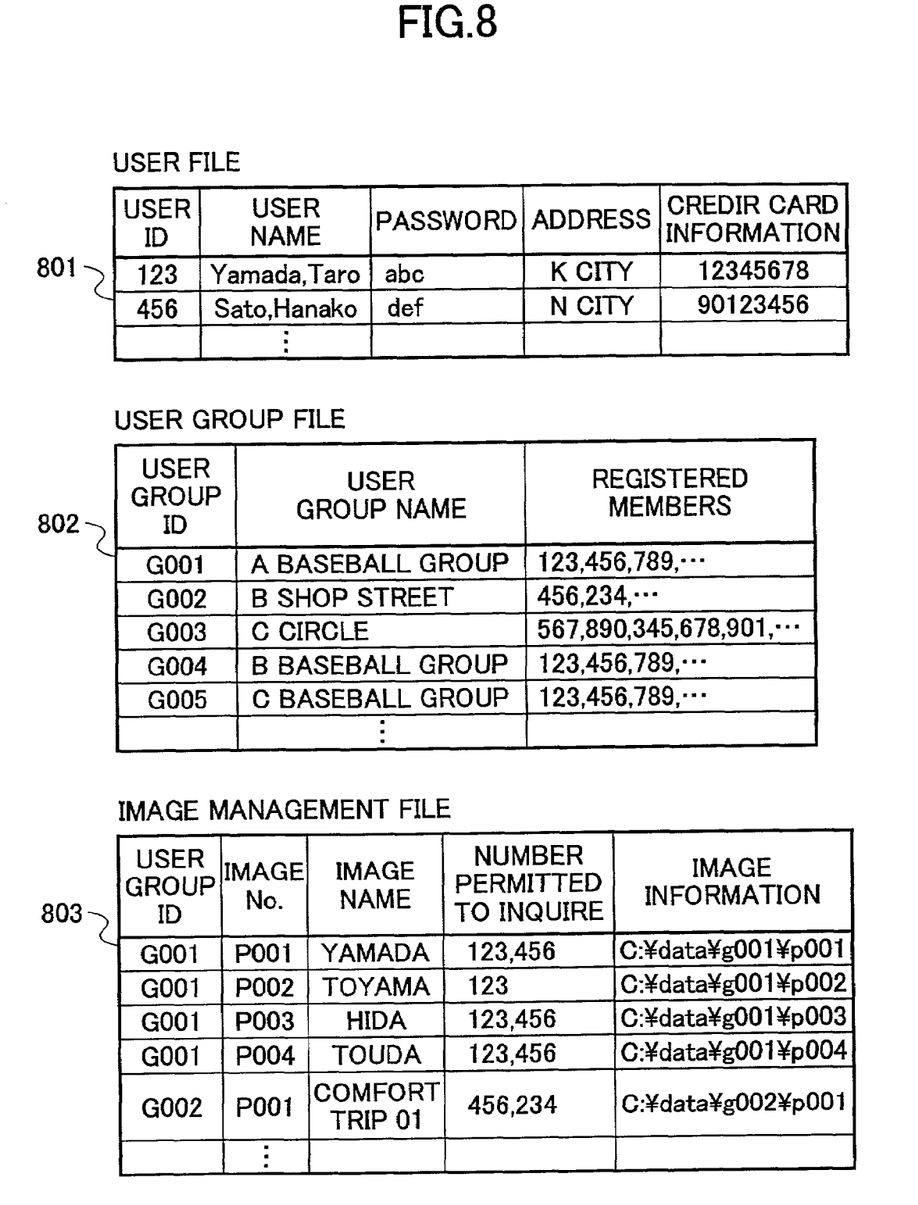
FIG. 8 is a diagram showing examples of a user file, user group file, and an image managing file.

A user file 801 in FIG. 8 is an example of the user file 109. The user file 801 includes the user ID identifying the user, a user name, the password for verification, an address, and credit card information.

The data extracting program 106 searches for the user file 801 by the user ID of the login information received in the step S302, as a search key.

In step S304, based on a search result in the step S303, it is determined to which step the user verifying process branches. As for the search result when it is determined that the user information matches with the search key and further a password indicated in the user information matches with the password indicated in the login information received from the user terminal 112, the user is successfully verified. Then, the user verifying process in the step S201 is completed.

However, as for the search result in the step S303 when it is determined that there is no user information matching with the search key or when the password indicated in the user information does not match with the password indicated in the login information received from the user terminal 112 even if the user information matches with the search key, the user is not verified. Thus, the user verification abnormally ends and the process goes to step S305.

In step S305, the sending program 104 sends to the user terminal 112 information showing a request of re-sending the login information. In this case, the user is required to send the login information again to the image intermediating system 102.

Figure 4:
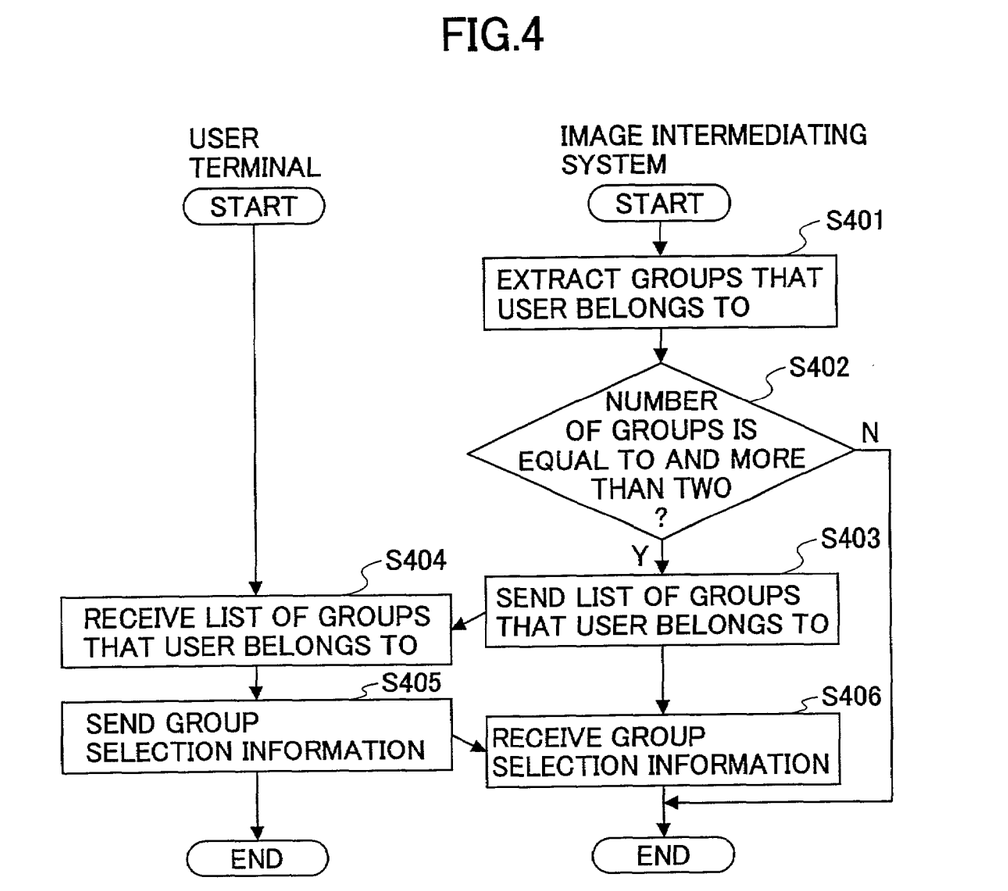
FIG. 4 is a flowchart for explaining a group selecting process.

The group selecting process in the step S202 in FIG. 2 will be described with reference to FIG. 4.

When the user verifying process in the step S201 is completed normally, the data extracting program 106 extracts the user group information showing a group to which the user belongs, by using the user group file 108 (step S401).

An example of the user group file 108 is shown as a user group file 802 in FIG. 8. The user file 802 stores a user group ID for identifying the user group, a user group name, and registered members of which the user ID of the user registered in the user group is registered.

In the user group file 802, the registered members where user group ID includes group G001 are users having the user Ids 123, 456, 789, . . . . The registered members where user group ID includes group G002 are users having the user Ids 456, 234, . . . . The registered members where user group ID includes group G003 are users having the user Ids 567, 890, 345, 678, 901, . . . . The registered members where user group ID includes group G004 are users having the user Ids 123, 456, 789, . . . . The registered members where user group ID includes group G005 are users having the user Ids 123, 456, 789, . . . .

The data extracting program 106 searches for the registered members of the user group file 802 by the user ID as a search key and extracts record information including the user ID.

Figure 10:
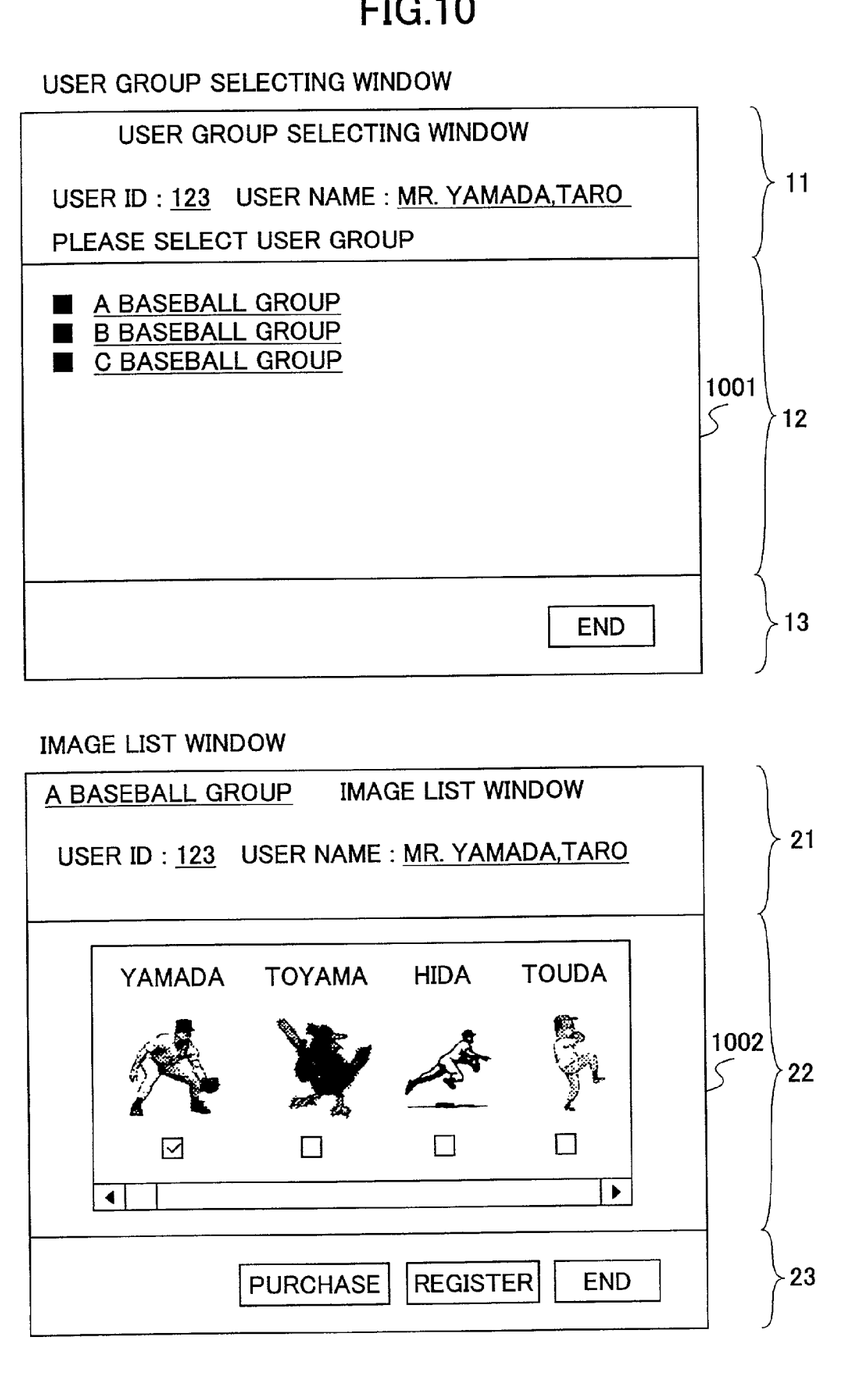
FIG. 10 is a diagram showing examples of a user group selecting window and an image list window.

Based on the record information extracted by the data extracting program 106, a user group selecting window is edited. A user group selecting window 1001 in FIG. 10 shows an example of the user group selecting window.

As a result of extracting the group information in the step S401, when the user does not belong to a plurality of groups, that is, when the user belongs to only one group and when it is not needed to select a group, the group selecting process in the step S202 is completed.

A user group selecting window 1001 is divided into a header 11, a body 12, and a footer 13. In the header 11, the user ID used when the user logs in at the user terminal 112 and the user name obtained by searching for the user file 801 by the user ID as a search key are transferred In the body 12, the user group names indicated by the record information extracted from the user group file 802 are transferred. In addition, in the body 12, a button for selection is provided for each user group name. In the footer 13, an end button is arranged.

When the user group selecting window 1001 is completely edited, the sending program 104 sends information of the user group selecting window 1001 to the user terminal 112 (step S403). The information is received by the user terminal 112 and displayed on a display unit (not shown) (step S404).

The user selects one of the user groups to display, from the body 12 of the user group selecting window 1001 and clicks the button for the selected user group. In response to an instruction from the user, the user terminal 112 sends group selection information to the image intermediating system 102 (step S405).

If the user clicks the end button of the user group selecting window 1001, the group selecting process is interrupted.

The group selection information sent in the step S405 is received by the receiving program 103 (step S406).

Figure 5:
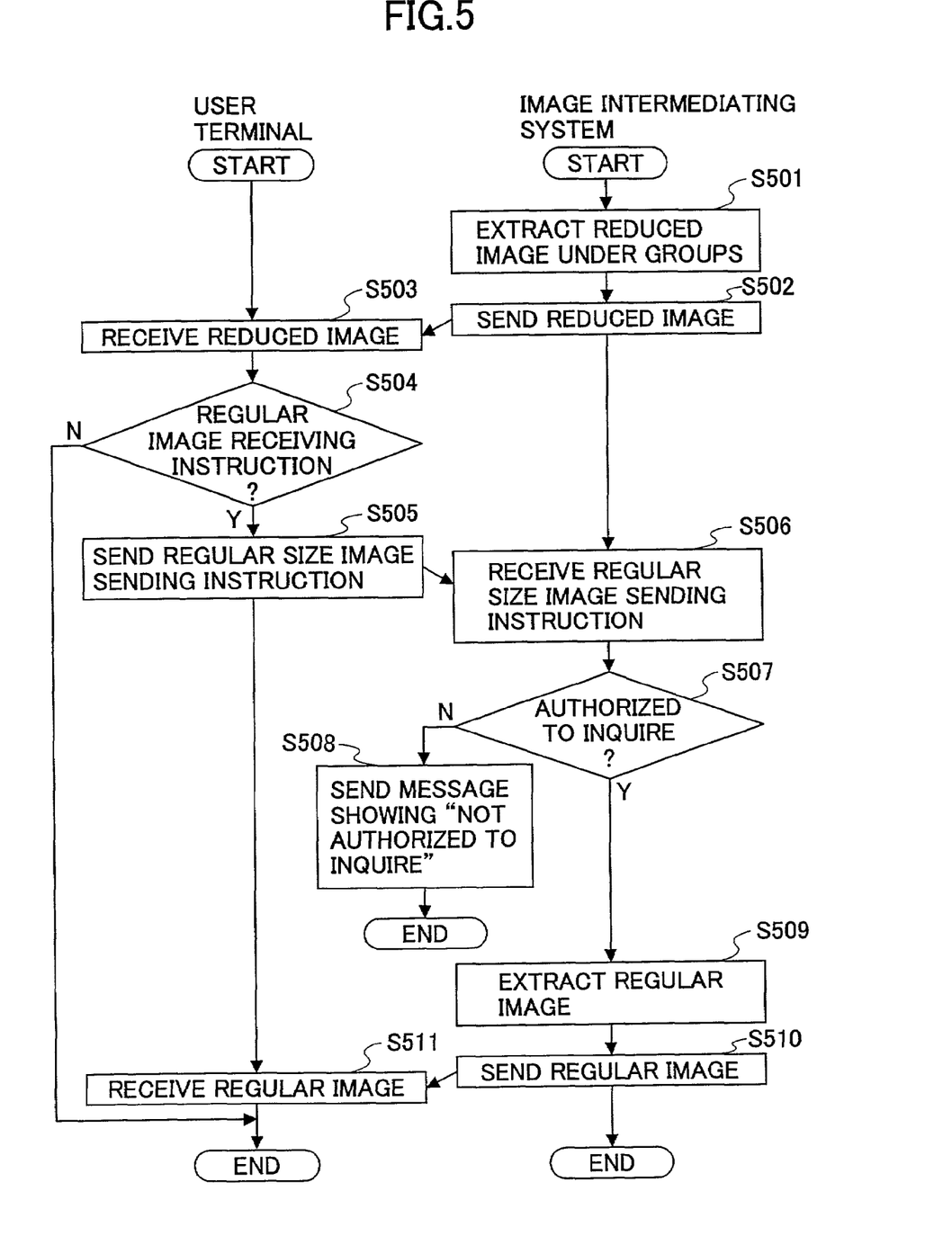
FIG. 5 is a flowchart for explaining an image displaying process.

The group selecting process in the step S203 in FIG. 2 will be described with reference to FIG. 5.

When the group selecting process in the step S202 is normally completed, the data extracting program 106 refers to the image managing file 110 and extracts a reduced image under the group selected by the user (step S501).

An image managing file 803 in FIG. 8 is an example of the image managing file 110. The image managing file 803 stores the user group ID showing the user group to which the image belongs, an image number identifying the image, an image name, members permitted to inquire, and the image information.

The members permitted to inquire are users who are permitted to inquire about the image. That is, users having user IDs 123 and 456 can inquire about image P001. Users having the user ID 123 can inquire about image P002. Users having the user IDs 123 and 456 can inquire about image P003. Users having the user IDs 123 and 456 can inquire about image P004. Users having user IDs 456 and 234 can inquire about image P005.

Also, the image information indicates pointer information toward an actual image file. That is, the image P001 of a user group G0000 is in a folder located at C:¥data¥g001¥p001. The image P002 of the user group G0000 is in a folder located at C:¥data¥g001¥p002. The image P003 of the user group G000 is in a folder located at C:¥data¥g001¥p003. The image P004 of the user group G001 is in a folder located at C:¥data¥g001¥p004. The image P001 of the user group G002 is in a folder located at C:¥data¥g002¥p001.

Figure 9:
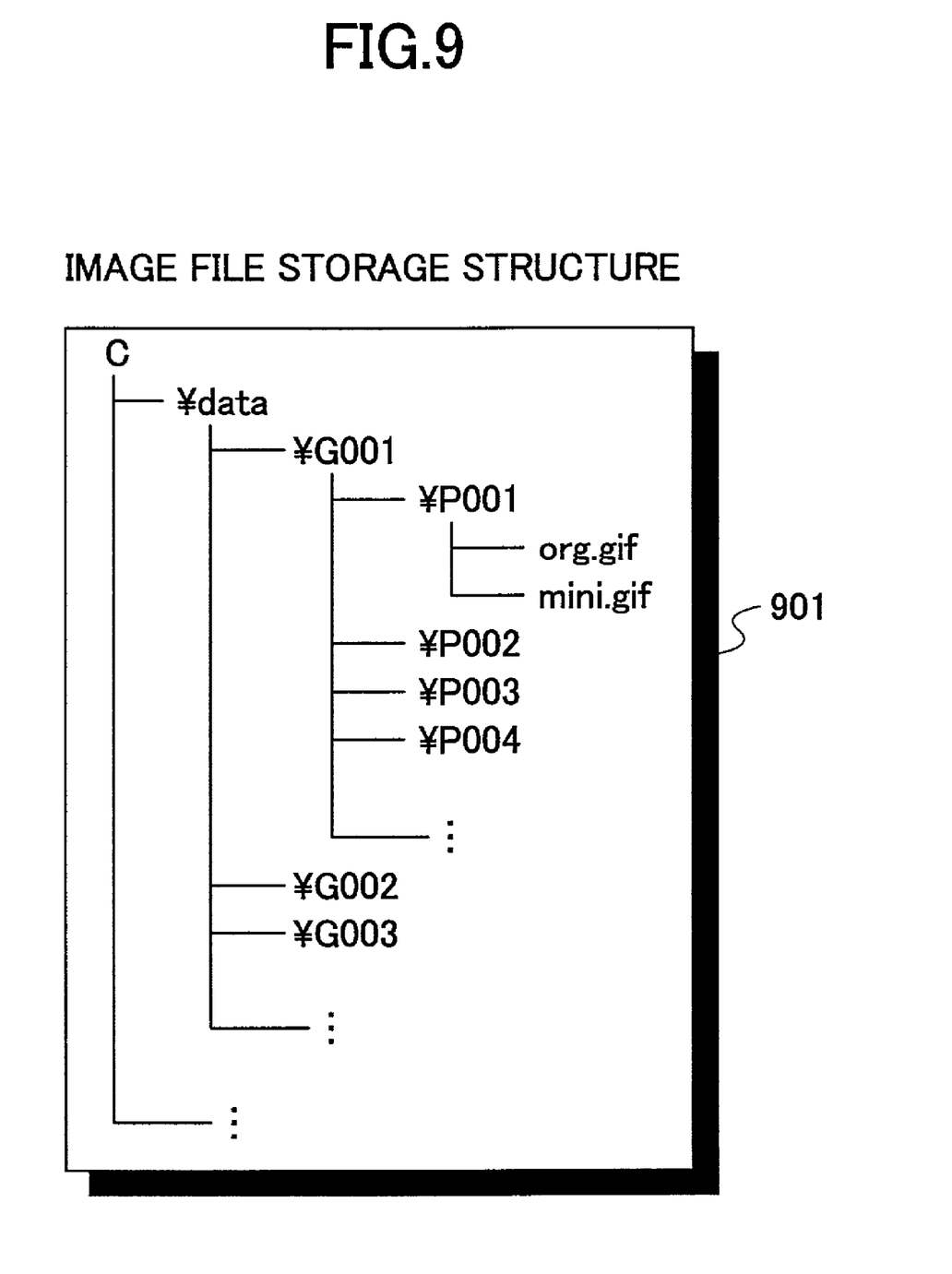
FIG. 9 is a diagram showing an example of a storage structure of the image file.

An image storing method will be further described with reference to an image file storage structure 901 in FIG. 9. Referring to FIG. 9, in data folders of a C drive, there are folders G001, G002, G003, . . . for the user groups, respectively. There are further folders P001, P002, P003, P004, . . . for each of the user groups.

And, the actual image file is stored in two forms such as an org.gif and a mini.gif in a folder for each image. The org.gif is a regular size image and the mini.gif is a reduced image reducing the regular size image.

The reduced image is extracted in the step S501.

Next, an image list window is edited based on reduced image information extracted as the reduced image. An image list window 1002 in FIG. 10 is an example of the image list window.

The image list window 1002 is divided into a header 21, a body 22, and a footer 23. In the header 21, the user group name of the user group selected in the step S202, the user ID used when the user logs in at the user terminal 112, and the user name obtained by searching for the user file 801 by the user ID as the search key are transferred.

In the body 22, the reduced images under the user group extracted in the step S501 are shown with the image names of the image managing file 803. In addition, a check box is provided for each image. Based on the number of images, a scroll bar for scrolling the images is displayed.

And in the footer 23, a purchase button, a register button, and an end button are arranged.

When the image list window 1002 is completely edited, the sending program 104 sends information of the image list window 1002 to the user terminal 112 (step S502). The information of the image list window 1002 is received by the user terminal 112 and displayed at the display unit (not shown).

Images displayed in the image list window 1002 received in the step S503 are the reduced images. When the user wants to see the regular size image (step S504), the user clicks one of the reduced images displayed in the image list window 1002 and then the user terminal 112 sends a regular size image sending instruction to the image intermediating system 102 (step S505).

When the image intermediating system 102 receives the regular size image sending instruction (step S506), the image intermediating system 102 checks whether or not the user is authorized to inquire about the image selected by the user based on the image managing file 803 (step S507).

As a result in the step S507, when the user is not authorized to inquire, that is, when there is no user ID of the user as a member permitted to inquire in the image managing file 803, a message showing "Not authorized to inquire" is sent to the user terminal 112 (step S508).

On the other hand, as a result in the step S507, when the user is authorized to inquire, that is, when there is the user ID of the user as a member permitted to inquire in the image managing file 803, the image managing file 803 is directed to extract the regular size image (step S509).

Next, an image displaying window is edited based on regular size image information extracted in the step S509. An example of the image displaying window is shown as an image displaying window 1102 in FIG. 11.

Figure 11:
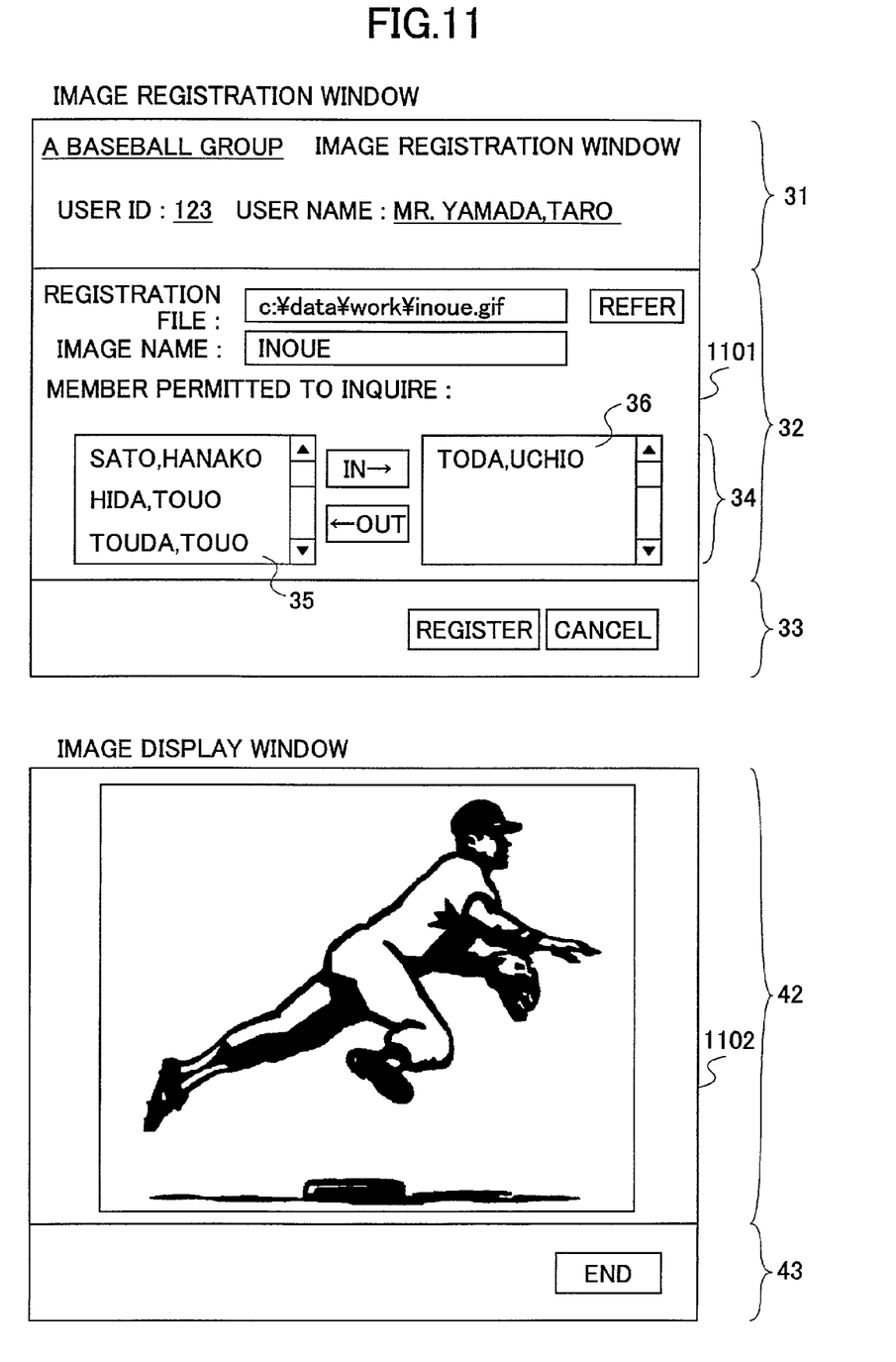
FIG. 11 is a diagram showing examples of an image registering window and an image displaying window.

The image displaying window 1102 is divided into a body 42 and a footer 43. In the body 42, the regular size image extracted in the step S509 is displayed. And in the footer 43, the end button is provided.

When the image displaying window 1102 is completely edited, the sending program 104 sends information of the image displaying window 1102 to the user terminal 112 (step S510). The information of the image displaying window 1102 is received by the user terminal 112 (step S511) and then displayed at the display unit (not shown).

When the user wants to end displaying the regular size image, the user clicks the end button provided in the footer 43 of the image displaying window 1102 and then the image list window 1002 is again displayed.

Three alternatives are provided to the user receiving the image list window 1002. An image registering process for registering a new image (step S204), an image purchasing process for purchasing the image (step S205), and a process to terminate (step S206) are provided to the user.

Figure 6:
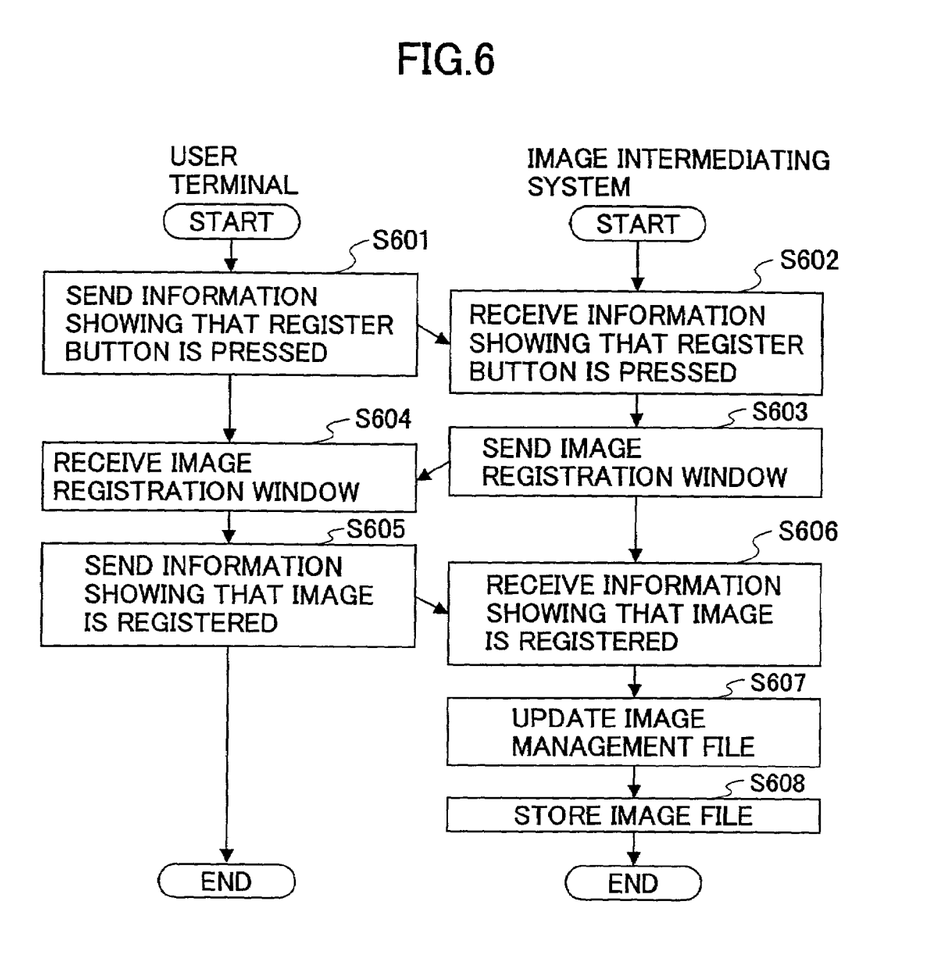
FIG. 6 is a flowchart for explaining an image registering process.

In a case in which the user registers the new image, when the user clicks the register button of the footer 23, register button clicked information is sent to the image intermediating system 102 (step S601).

When the receiving program 103 receives the register button clicked information sent in the step S601, a window for registering the image is formed. An example of the window for registering the image is shown as an image registering window 1101 in FIG. 11.

The image registering window 1101 is divided into the header 31, a body 32, and a footer 33. In the header 31, the user group name of the user group selected in the step S202, the user ID used when the user logs in at the user terminal 112, and the user name obtained by searching for the user file 801 by the user ID as the search key are transferred.

In the body 32, a text box for indicating which image the user wants to register, another text box for indicating the image name of the image which the user wants to register, and two list boxes 35 and 36 for authorizing to inquire about the image are provided.

The user group file 802 is referred to and user names included in the user group selected in the step S202 are transferred to the list box 35. The list box 36 is provided to show a list of user names selected by the user.

In the footer 33, a register button and a cancel button are provided.

When the image registering window 1101 is completely edited, the sending program 104 sends information of the image registering window 1101 (step S603). The information of the image registering window 1101 is received by the user terminal 112 (step S604) and then displayed at the display unit.

When the user terminal 112 receives and displays the image registering window 1101, the user indicates a registration file, the image name, and the members permitted to inquire.

The text box for indicating the registration file is used for a method in which a location storing the image file and a file name are directly indicated. Alternatively, the text box is used for another method in which a folder and a file are selectively indicated in a dialog box (not shown) for indicating a file displayed by clicking a refer button positioned at the right side of the list box.

In the body 32 of the image registering window 1101 displayed at the user terminal 112, an area 34 for selecting members permitted to inquire includes the list box 35 located at the left side and displaying a list of the user names of the group, the list box 36 located at the right side and displaying a list of the user names currently permitted to inquire, an IN button, and an OUT button.

The user selects the user name to permit to inquire from the list box 35 and clicks the IN button to move the user name to the list box 36 located at the right side. On the other hand, the user selects the user name to invalid a permission to inquire from the list box 36 and clicks the OUT button to move the user name to the list box 35 located at the left side.

When the user completes to input image registration information to the image registering window 1101 and clicks the register button in the footer 33, the image registration information is sent to the image intermediating system 102 (step S605). The image registration information sent in the step S605 is received by the receiving program 103 (step S606).

The data registering program 105 stores the image registration information received in the step S606 to the image managing file 803 (step S607). The group ID of the group selected in the step S202 is stored as the user group ID of the image managing file 803. An image number is automatically obtained and stored as an image No. of the image managing file 803. An image name is transferred from the image registration information. The members permitted to inquire are transferred. Then, the group ID, the image No., the image name, and the members permitted to inquire are stored in one record.

Since the folder name is uniquely given for each image as a folder for the group selected in the step S202, pointer information of the folder is stored as image information in the image management file 803.

Subsequently, as indicated by the pointer information, an actual image file is stored in the external storage unit of the image intermediating system 102 (step S608). In this case, the regular size image file is named as the org.gif and the regular size image file is automatically reduced and the reduced image file is named as the mini.gif. The org.gif and the mini.gif are stored in the folder newly created.

Figure 7:
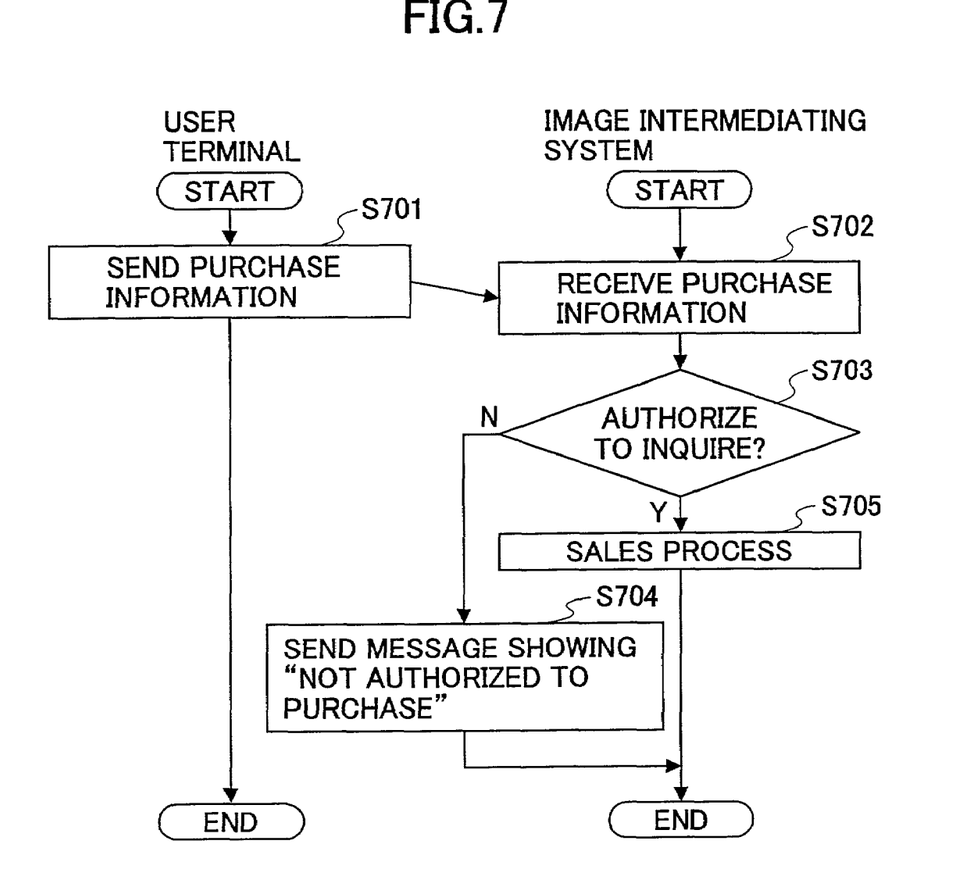
FIG. 7 is a flowchart for explaining an image purchasing process.

The image purchasing process in the step S205 in FIG. 2 will be described in detail with reference to FIG. 7.

When the user purchases the image, in the image list window 1002 displayed at the display unit of the user terminal 112 in the step S203, the user makes a check mark in a check box provided under a desired image and then clicks the purchase button in the footer 23. Purchase information including the image ID identifying the desired image is sent to the image intermediating system 102 (step S701).

When the receiving program 103 receives the purchase information sent in the step S701 (step S702), the image intermediating system 102 checks whether or not the user is permitted to inquire about the desired image selected by the user based on the image managing file 803.

As a check result in the step S703, when the user is not permitted to inquire, that is, when the user ID of the user is not included in the members permitted to inquire in the image managing file 803, a message showing "Not authorized to purchase" is sent to the user terminal 112 (step S704).

On the other hand, as the check result in the step S703, when the user is permitted to inquire, that is, when the user ID of the user is included in the members permitted to inquire in the image managing file 803, a sales process is executed (step S705). Specifically, the purchase information including the user ID and the image ID is provided to the receiving program 107. The receiving program 107 searches for the user file 801 based on the purchase information, extracts address information and the credit card information, and provides the purchase information, the address information, and the credit card information to a sales system of the image intermediating system 101.

A conventional technique can be applied to the sales process in the sales system for shopping by a credit card or an online shopping. Thus, a detailed explanation thereof is omitted.

In the embodiment, the address information and the credit card information of the user are maintained in the user file 801. Alternatively, the address information and the credit card information can be managed in another system (regardless of whether an inside or an outside of the image intermediating site 101.

Moreover, in the embodiment, a static image is illustrated to explain the image provided by the image intermediating system 102. Alternatively, the image provided by the image intermediating system 102 can be a dynamic image.

Furthermore, in the embodiment, the user group is related to the image information in the image managing file 110. Alternatively, attribute information can be provided for every image and the attribute information can be related to the user group information.

Moreover, a method for intermediating images applied to the image intermediating system 102 can be programmed and recorded in a computer-readable recording medium. Thus, the method can be realized by executing a program recorded in the computer-readable recording medium. As the computer-readable recording medium, a magnetic recording device or a semiconductor memory can be used. In a case of distributing in a market, the program in accordance with the method can be stored in a portable recording medium such as the CD-ROM 2 in FIG. 1, a floppy disk, or the like, or the program can be transmitted to another computer through the network.

In a case of traveling in a group, freely sharing the album within the group is provided. It is possible for the user being a photographer to freely inquire about the image or register the image from anywhere the user can connect to the network. In addition, it is possible to set the members permitted to inquire for each image. Thus, although all members of the group can refer to the reduced image, only members permitted to inquire are allowed to inquire about the regular size image. Moreover, only members permitted to inquire can purchase the image. Accordingly, such a flexible setting can be realized.

The present invention is not limited to the specifically disclosed embodiments, variations and modifications, and other variations and modifications may be made without departing from the scope of the present invention.

The present application is based on Japanese Priority Application No.2001-218037 filed on Jul. 18, 2001, the entire contents of which are hereby incorporated by reference.

What is claimed is:

1. A method for intermediating images, comprising:
   registering at least one user to at least one user group at a service site via a user terminal connected with the service site over a network by assigning authentication information to the at least one user;
   allowing users belonging to user groups to register images via respective user terminals by corresponding to user group information showing at least one user group to which the images belong, at a service site to be shared among selected users in respective user groups as selected by a respective user registering an image;
   receiving the authentication information of a user belonging to at least one user group;
   extracting the user group information concerning the at least one user group to which the user belongs, from a user group table recording a relationship between the user and the user group based on the authentication information;
   sending the user group information extracted to the user and obtaining information of a respective user group selected by the user;
   extracting at least one image corresponding to the respective user group selected by the user from the registered images of the respective user group; and
   sending the image corresponding to the respective user group to the user.

2. The method as claimed in claim 1, wherein said sending the image comprises:
   sending a reduced image; and
   sending a regular size image only when the user is permitted to inquire.

3. A system for intermediating images, the system comprising a processor configured to execute the following:
   register at least one user to at least one user group at a service site via a user terminal connected with the service site over a network by assigning authentication information to the at least one user;
   allow users belonging to user groups to register images via respective user terminals by corresponding to user group information showing at least one user group to which the images belong, at a service site to be shared among selected users in respective user groups as selected by a respective user registering an image;
   receive the authentication information of a user;
   extract the user group information concerning at least one user group to which the user belongs, from a user group table recording a relationship between the user and the user group based on the authentication information;
   send the user group information extracted to the user and obtaining information of a respective user group selected by the user;
   extract an image corresponding to the respective user group selected by the user; and
   send the image corresponding to the respective user group to the user.

4. A computer-readable medium encoded with processing instructions for performing a method of intermediate images performed by a computer, the method comprising:
   registering at least one user to at least one user group at a service site via a user terminal connected with the service sit over a network by assigning authentication information to the at least one user;
   allowing users belonging to user groups to register images via respective user terminals by corresponding to user group information showing at least one user group to which the images belong at a service site to be shared among selected users in respective user groups as selected by a respective user registering an image;
   receiving authentication information of a user belonging to at least one user group;
   extracting the user group information concerning the at least one user group to which the user belongs, from a user group table recording a relationship between the user and the user group based on the authentication information;
   sending the user group information extracted to the user and obtaining information of a respective user group selected by the user;
   extracting at least one image corresponding to the selected user group selected by the user from the registered images of the respective user group; and
   sending the image corresponding to the respective user group to the user.

5. A method of viewing images stored in a network, the method comprising:
   registering at least one user to at least one user group at a service site via a user terminal connected with the service site over a network by assigning authentication information to the at least one user;
   allowing users belonging to user groups to register images via respective user terminals by corresponding to user group information showing at least one user group to which the images belong at a service site to be shared among selected users in respective user groups as selected by a respective user registering an image;
   extracting the user group information corresponding to user groups of which a registered user is registered;
   sending the extracted user group information to the registered user and obtaining from the registered user, a respective user group from the user groups; and
   sending an image corresponding to the respective user group to the user, to be viewed by the user.

6. The method of claim 5, further comprises allowing the registered user to purchase the viewed image.

* * * * *

UNITED STATES PATENT AND TRADEMARK OFFICE
CERTIFICATE OF CORRECTION

PATENT NO. : 7,272,798 B2 Page 1 of 1
APPLICATION NO. : 10/108424
DATED : September 18, 2007
INVENTOR(S) : Tokuya Hayakawa et al.

It is certified that error appears in the above-identified patent and that said Letters Patent is hereby corrected as shown below:

Column 10, Line 21, change "sit" to --site--.

Signed and Sealed this

Fifteenth Day of April, 2008

JON W. DUDAS
*Director of the United States Patent and Trademark Office*